United States Patent [19]

Hales et al.

[11] 4,299,426
[45] Nov. 10, 1981

[54] PRESSURE MODULATING VALVES FOR BRAKING SYSTEMS

[75] Inventors: Eric C. Hales; Harold Hodkinson, both of Leamington Spa, England

[73] Assignee: Automotive Products Limited, Leamington Spa, England

[21] Appl. No.: 90,742

[22] Filed: Nov. 2, 1979

Related U.S. Application Data

[63] Continuation of Ser. No. 847,565, Nov. 1, 1977, abandoned.

[30] Foreign Application Priority Data

Nov. 4, 1976 [GB] United Kingdom ............ 45867/76

[51] Int. Cl.³ ............................................. B60T 13/00
[52] U.S. Cl. ................................. 303/6 C; 303/22 R
[58] Field of Search ................. 303/6 C, 22 R, 115; 188/349; 137/87

[56] References Cited

U.S. PATENT DOCUMENTS 3,866,984  2/1975  Seip .............................. 303/6 C X

FOREIGN PATENT DOCUMENTS 2434229  2/1975  Fed. Rep. of Germany .... 303/22 R
2600813  7/1976  Fed. Rep. of Germany .... 303/22 R Primary Examiner—J. D. Miller
Assistant Examiner—Reinhard J. Eisenzopf
Attorney, Agent, or Firm—Kemon & Estabrook

[57] ABSTRACT

A dual pressure modulating valve unit for a motor vehicle braking system has two identical valves arranged side-by-side in a common housing, each valve being for inclusion in separate sub-systems of a split braking system. The valves are of the pressure limiting or pressure reducing type wherein the pressure at which the valves start to reduce or limit the outlet pressure is determined by a biassing load on the valve plungers. The biassing loads are provided by a beam which normally divides the load of a single biassing spring equally between each plunger. In the event of a failure in one sub-system the plunger of the valve in the other sub-system receives the full load of the spring so that the pressure at which that valve starts to limit or reduce is substantially increased.

4 Claims, 8 Drawing Figures

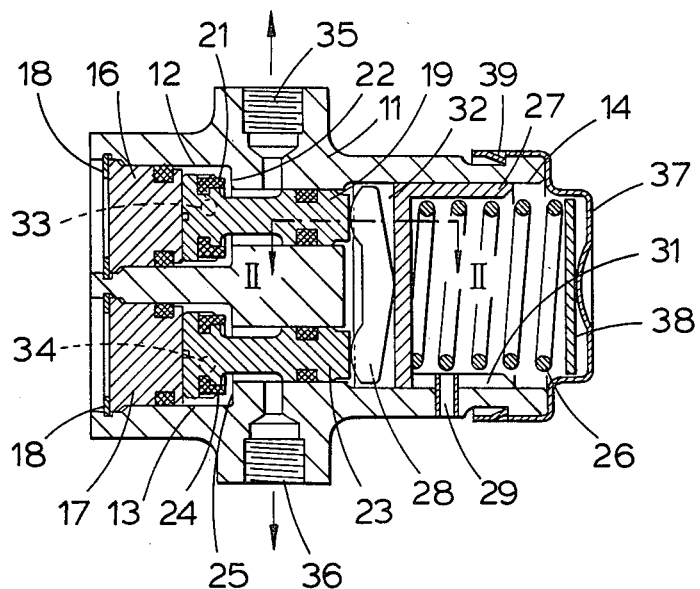
Fig. 1
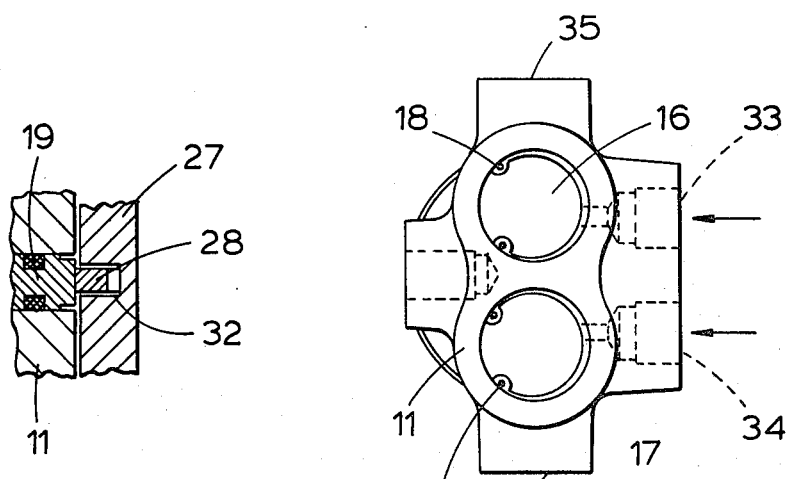
Fig. 2
Fig. 3

PRESSURE MODULATING VALVES FOR BRAKING SYSTEMS

This is a continuation of application Ser. No. 847,565, filed Nov. 1, 1977, now abandoned.

The invention relates to pressure modulating valves particularly, but not exclusively, for motor vehicle braking systems. The modulating valves are of a type which operate to limit or reduce the pressure supplied to a brake actuator acting on a rear brake of the vehicle from a driver controlled source such as a master cylinder once the pressure from the driver controlled source has reached a particular value. Conveniently the pressure supplied to the brake actuator is hereinafter referred to as the "brake pressure", the pressure from the driver controlled source is hereinafter referred to as the "master cylinder pressure" and the particular value of master cylinder pressure at which the modulating valve starts to limit or reduce pressure is hereinafter referred to as the "cut-in pressure". The cut-in pressure is determined by the magnitude of a resilient biasing load which acts on a plunger of the valve in opposition to the brake pressure or master cylinder pressure.

It is known to provide a pair of brake pressure modulating valves for a split braking system in which two plungers operate in separate bores to control separate sub-systems of the split system but are acted on by common biasing means through a loading mechanism which apportions the load of the common biasing means such that the ratio of the loads applied to the plungers remains substantially constant for all operating conditions. Hence the cut-in pressures are in the same ratio. The usual arrangement is for one valve to serve one rear brake of the vehicle and for the other valve to serve the other rear brake, the ratio of the efforts applied to the plungers being 1:1 to give equal braking on each wheel. Such an arrangement of two valves is conveniently referred to as a dual valve unit. However, should there be a failure in one sub-system of the split system such that there is no master cylinder pressure generated in that sub-system, then in the known dual brake pressure modulating valve unit the valve which is part of the other sub-system will continue to operate at substantially the same cut-in pressure as when both valves are operating normally. This is a disadvantage because the normal transfer of vertical load from the rear wheels to the front wheels during braking is altered and a considerably higher brake pressure is required for the same deceleration.

It is an object of the invention to provide a dual pressure modulating valve unit wherein failure of pressure in one sub-system of a split fluid pressure braking system into which the dual valve unit is connected causes the valve which is incorporated in the other sub-system to operate at a higher cut-in pressure than when both subsystems are functioning normally.

According to the invention, a dual brake pressure modulating valve unit for a vehicle braking system comprises a pair of valves, each valve including a housing having a bore therein which extends substantially parallel to the bore of the other valve, an inlet port for connection to a master cylinder or equivalent, an outlet port for connection to a respective brake actuator and a plunger movable in the bore against a biasing load by pressure at one of said ports to prevent the pressure at the outlet port increasing at the same rate as pressure at the inlet port when the pressure at the inlet port reaches a magnitude dependent on the magnitude of the respective biassing load, common biassing means which provide the biassing load on each plunger and a loading mechanism which apportions the effort of the common biassing means such that the ratio of the biassing loads on the plungers remains substantially constant for all normal operating conditions, wherein the loading mechanism comprises a beam, the plunger of one valve being operably connected to the beam adjacent one end thereof, the plunger of the other valve being operably connected to the beam adjacent the other end thereof and the common biassing means being operably connected to the beam intermediate the ends thereof, the beam having a limited effective tilting movement such that if part of the vehicle braking system fails and there is no pressure at the inlet or outlet ports of one of the valves then an increased proportion of the effort of the common biassing means can act on the plunger of the other valve when the plunger of the other valve is moved by fluid pressure against the biassing load.

The beam may be arranged to pivot on a support member which is guided for movement without tilting such that the support member can apply the full load of the biassing means to the plunger of said other valve when there is no pressure at the inlet or outlet ports of said one valve. Alternatively the beam may comprise or form part of a member slidable in a parallel sided bore under the action of the common biassing means, the member being shaped for limited tilting movement in the bore.

The beam may be arranged to pivot on a support member which applies the load of the biassing means to the beam and is guided for movement without tilting, the support member and the beam being shaped so that the pivot axis moves laterally when the beam tilts.

Some embodiments of the invention will now be described by way of example and with reference to the accompanying drawings, of which:

FIG. 1 is a cross-sectional view of one embodiment of a dual pressure limiting valve unit according to the invention;

FIG. 2 is a scrap-section on the line II—II of FIG. 1;

FIG. 3 is an end elevation of the valve unit shown in FIG. 1;

Figure 4:
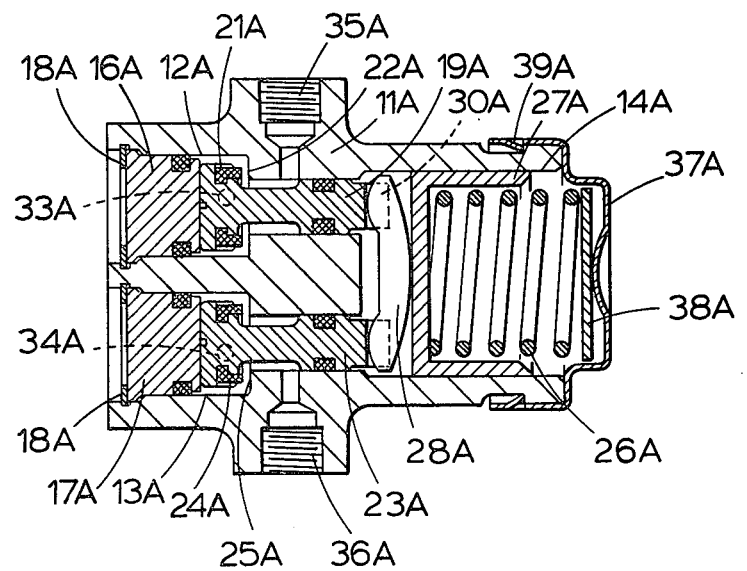
FIG. 4 is a cross-sectional view, similar to that of FIG. 1 showing a modification to the valve unit shown in FIGS. 1-3.

The dual valve unit shown in FIGS. 1-3 comprises two limiting valves in a common housing 11. The housing has a first stepped bore 12 and a second stepped bore 13 whose axis is parallel to that of bore 12. The smaller diameter bore portions of both bores 12 and 13 open into a large bore 14 whose axis is parallel to and in the same plane as the axis of the stepped bores 12, 13 and is equidistant from each. The opposite ends of the stepped bores 12 and 13 are each closed by end plugs 16 and 17 respectively, the plugs 16 and 17 being retained by circlips 18.

The first stepped bore 12 houses a first stepped plunger 19 which slides in the smaller diameter bore portion and has a head which carries a rubber seal 21 for sealing against the step 22 between the larger diameter and smaller diameter bore portions. A second plunger 23, identical to the first plunger 19, is housed in the second stepped bore 13 and has a rubber seal 24 for sealing against the step 25 between the corresponding larger and smaller diameter bore portions.

The plungers 19 and 23 are biassed towards their respective end plugs 16 and 17 by common biassing means comprising a helical compression spring 26 which acts on a support member in the form of a cup-shaped plunger 27 which slides in the large bore 14 and which transmits the effort of spring 26 to the plungers through a beam 28. The cup-shaped plunger 27 is guided against rotation in the bore 14 by a tubular peg 29 which extends from the housing 11 into a slot 31 in the skirt of plunger 27. The beam 28 is carried in a groove 32 in the base of plunger 27, the flanks of the groove 32 ensuring that the beam 28 is located laterally and is aligned with the plungers 19 and 23. The end portions of the beam 28 are shaped so that they can pivot on the plungers 19 and 23 and the centre portion is shaped so that it can pivot on the cup shaped plunger 27 about an axis which is transverse to and intersects the axis of bore 14. Hence the beam 28 is able to tilt and thus divide the load from the spring 26 as equal biassing loads on the plungers 19 and 23.

The housing 11 incorporates first and second inlet ports 33 and 34 opening into the large diameter portions of bores 12 and 13 respectively and first and second outlet ports 35 and 36 opening into the smaller diameter portions of bores 12 and 13 respectively. The first inlet port 33 is for connection to master cylinder pressure in one sub-system of a split braking system on a motor vehicle and the second inlet port 34 is for connection to master cylinder pressure in the other sub-system. The first outlet port 35 is for connection to the one sub-system to provide brake pressure in the one sub-system and the second outlet port 36 is for providing brake pressure in the other sub-system.

When both brake sub-systems are working normally, the master cylinder pressures build up substantially equally at the inlet ports 33 and 34 until the fluid pressure loading on each plunger 19 and 23 moves it against the biassing load from the beam 28 to bring the respective seal 21, 24 into sealing abutment with the respective step 22, 25. The first outlet port 35 is now isolated from the first inlet port 33 and the second outlet port 36 is isolated from the second inlet port 34. Any further increases in the master cylinder pressures only serve to bias seals 21, 24 harder into abutment with steps 22, 25 so that the braking pressures are limited to equal magnitudes set by the load of spring 26 (the cut-in pressures). These magnitudes are adjustable by deforming the base of a cup-shaped pressing 37 which the spring bears against through a disc 38. Tags 39 sheared out of a rim portion of pressing 37 engage in a circumferential groove in the housing 11 to retain the pressing 37 on the housing 11.

The distance through which each of the plungers 19 and 23 must move for the respective seals 21 and 24 to seat on the steps 22 and 25 is shown as dimension X (FIG. 1). The clearance between each plunger 19 and 23 and the end face of the cup-shaped plunger 27 when both plungers 19 and 23 are in contact with their respective end plugs 16 and 17 is shown as dimension Y (FIG. 2). If one brake sub-system has a failure which results in the loss of master cylinder pressure at one of the inlet ports 33 and 34 then the plunger 19 or 23 associated with that one sub-system remains in, or moves into abutment with the respective end plug 16 or 17 whilst the other plunger 19 or 23 associated with the other, still functioning, sub-system is moved away, or remains spaced, from its end plug 16 or 17 by pressure at the respective inlet port 33 or 34. However, the valve unit is constructed so that dimension Y is less than half that of dimension X so that, assuming for example that pressure has failed at the first inlet port 33, the second plunger 23 moves into abutment with the end face of the cup-shaped plunger 27 under the action of pressure at the second inlet port 34 before seal 24 can seat on step 25. The fluid pressure loading on the second plunger 23 now has to overcome the full biassing load of spring 26 transmitted by direct contact with plunger 27 instead of half the load transmitted through the beam 28. Hence the pressure at which seal 24 on the second plunger 23 seats on step 25 is substantially twice the normal cut-in pressure and this gives a better braking force distribution appropriate to the reduced deceleration of the vehicle with one brake sub-system failed.

In the modification shown in FIG. 4 parts which are similar to those shown in FIGS. 1–3 carry the same reference numeral but with a suffix A. The beam 28A is shaped with the surface in contact with the cup-shaped plunger 27A having a large radius so that when one sub-system fails and only one plunger, for example plunger 23A, is subject to fluid pressure and moves away from the associated end plug 17A, the axis about which the beam 28A pivots on the end face of the cup-shaped plunger 27A moves nearer the axis of plunger 23A. Hence the biassing load on plunger 23A at the point when seal 24A seats on step 25A is much greater than half the load of spring 26A.

The cup-shaped plunger 27A is simplified compared with plunger 27 by eliminating the slot 32 and providing instead slots in the ends of plungers 19A and 23A which locate the beam 28A laterally. This eliminates the need for a slot corresponding to slot 31 and a peg corresponding to peg 29.

Figure 5:
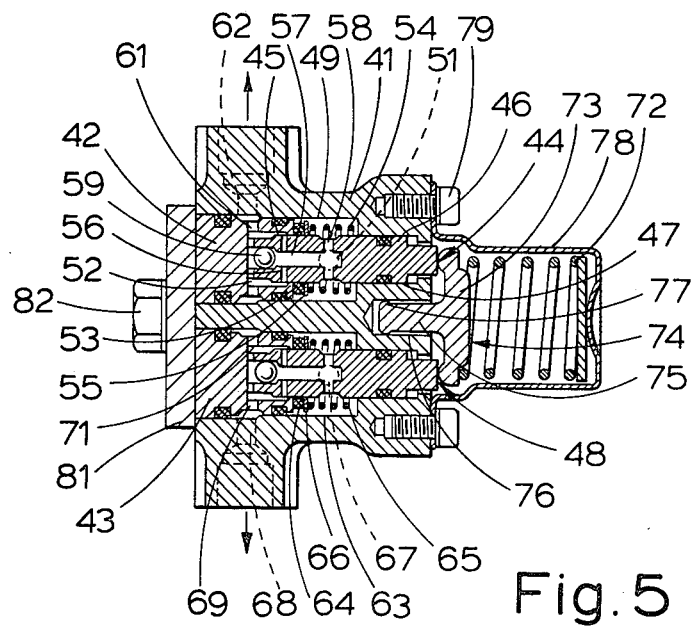
FIG. 5 is a cross-sectional view of a second embodiment of a dual pressure limiting valve unit according to the invention.
Figure 6:
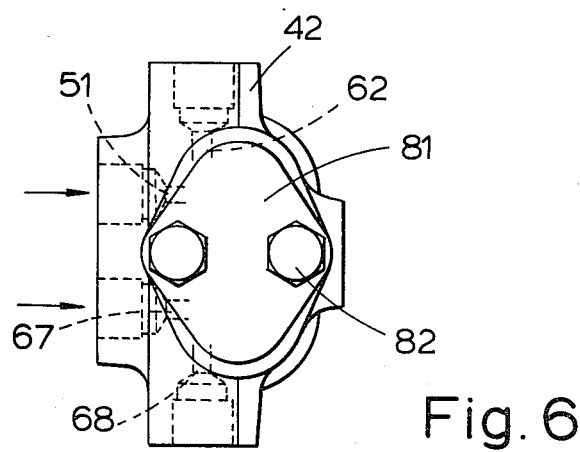
FIG. 6 is an end elevation of the valve unit shown in FIG. 5.

The dual valve unit shown in FIGS. 5 and 6 comprises a pair of limiting valves in a common housing which includes a main body 41, in which there are first and second stepped bores whose axis are parallel to each other, and first and second end plugs 42 and 43, a respective one of which is situated in the larger end of each stepped bore.

A first plunger 44 having a first cylindrical surface portion 45 adjacent one end and a second cylindrical surface portion 46 of the same diameter adjacent the other end is slidable in the smaller diameter bore portion 47 of the stepped bore containing the first end plug 42. A second plunger 48 is slidable in the stepped bore containing the second end plug 43.

A first annular chamber 49 is defined by the body 41 and the first plunger 44 and is connected to a first inlet port 51. A first end chamber 52 is defined by a recess in first end plug 42, the end of the first plunger 44 adjacent the first cylindrical surface portion 45 and that part of surface portion 45 which is nearer that end of the plunger, i.e. nearer the first end plug 42. An annular resilient seal 53 of rubber or synthetic rubber is situated in the annular chamber 49 and is slidable over the surface portion 45. A light helical compression spring 54 biases the seal 53 towards end chamber 52 and into sealing abutment with an end wall of annular chamber 49 defined by the annular end face of end plug 42. This seal 53 serves to isolate end chamber 52 from annular chamber 49. A washer 55 prevents the spring 54 digging into the seal 53.

End chamber 52 is connected to annular chamber 49 through a diametral passage 56 in the first plunger 44, an axial passage 57 and another diametral passage 58. One end of axial passage 57 is blocked by a steel ball 59 which is a press fit in the passage 57. Slots in the end face of plunger 44 allow circulation of brake fluid in the end chamber 52 and radial drillings 61 in an annular extension of end plug 42 which encircles the end chamber 52 allow communication with a first outlet port 62.

The second plunger 48 is identical to the first plunger 44. A second annular chamber 63 corresponds to chamber 49 and has an annular seal 64, a spring 65 and a washer 66 corresponding to seal 53, spring 54 and washer 55 respectively. A second inlet port 67 corresponds to the first inlet port 51 and a second outlet port 68 corresponds to the first outlet port 62. The second outlet port 68 communicates through radial drillings 69 in the second end plug 43 with a second end chamber 71 corresponding to the first end chamber 52.

Each plunger 44 and 48 is biased towards the associated end plug 42, 43 by a common helical compression spring 72 acting through the head 73 of a mushroom-shaped member 74. This head 73 acts as a beam to apportion the biasing load of spring 72 equally between the two plungers 44 and 48, the rim of the head 73 being beaded to allow it to pivot on the abutting end face of each plunger 44 and 48. The member 74 has a stem portion 75 which is a generous clearance in a parallel blind bore 76 in the housing body 41 except near the free end of the stem portion 75 where the diameter is increased to form a part-spherical end portion 77. The spring 72 is retained by a cup-shaped pressing 78 secured to the body 41 by setscrews 79. At the other end of the body 41, a plate 81 secured by setscrews 82 is used to retain the end plugs 41 and 43.

The first inlet port 51 is for connection to master cylinder pressure in one sub-system of a split braking system on a motor vehicle and the second inlet port 67 is for connection to master cylinder pressure in the other sub-system. The first outlet port 62 is for connection to the one sub-system to provide pressure to a brake actuator of a rear brake in the one sub-system and the second outlet port 68 is for providing brake pressure to another brake actuator of a rear brake in the other sub-system.

With no pressure at either inlet port 51 or 67 the plungers 44 and 48 are each biassed by spring 72 so that the slotted end abuts the associated end plug 42 or 43. In this position brake fluid can flow from the first inlet port 51 into the first annular chamber 49 and through passages 58, 57 and 56 into the end chamber 52 and out of the first outlet port 62 via the radial drillings 61. Similarly, brake fluid can flow from the second inlet port 67 into the second annular chamber 63, through the second plunger 48 into the second end chamber 71 and out of the second outlet port 68 via radial drillings 69.

As pressure to the rear brakes increases, the pressure in each end chamber 52, 71 builds up to a level which causes each plunger 44, 48 to move against the spring 72. The first plunger 44 thus moves through annular seal 53 and allows this seal 53 to block diametral passages 56 and prevent a further increase of pressure at the first outlet port 62 whilst the second plunger 48 moves through annular seal 64 and allows this seal 64 to block the corresponding diametral passage in the second plunger 48 and prevent a further increase of pressure at the second outlet port 68.

With decreasing pressure at the inlet ports 51 and 67, each seal 53 and 64 lifts away from the annular end of the associated end plug 42, 43 when the master cylinder pressure drops to a value which is slightly below the rear brake pressure. This allows brake fluid to flow between each seal 53, 64 and the annular end of the associated end plug 42, 43 and into the respective end chamber 53, 71 through a diametrical clearance between the plunger 44, 48 and the respective end plug 42, 43. This gives a reduction of pressure in each end chamber 52, such that each plunger 44, 48 moves under the load of the spring 72 to uncover the diametral passages and allow a return of fluid through the inlet ports.

Since the movement of the plungers 44 and 48 is controlled by brake pressure rather than master cylinder pressure, the inevitable pressure drop between master cylinder pressure and brake pressure arising from a high flow rate associated with a sudden application of the brakes does not alter the magnitude of the pressure to which the rear brakes are limited. Should rear brake pressure drop after the valve ports are blocked due to expansion of the rear brake drums, the plungers 44 and 48 will move under the biassing load of the spring 72 to allow the rear brake pressure to be restored to the limiting magnitude. This limiting magnitude is adjustable by deforming the base of the cup-shaped pressing 78 and is the same for both pressure at the first outlet port 62 and at the second outlet port 68 by virtue of the balancing effect of the mushroom-shaped member 74.

If one brake sub-system suffers a failure which results in the loss of pressure at one of the inlet or outlet ports 51,62, 67 or 68, then the plunger 44 or 48 associated with that one sub-system remains in, or moves into abutment with the respective end plug 42 or 43 whilst the other plunger 44 or 48 associated with the other, still functioning, sub-system is moved away or remains spaced, from its end plug 42 or 43 by pressure at the respective outlet port 62 or 68. The mushroom shaped member 74 then tilts about the centre of the part-spherical end portion 77 until the stem portion 75 contacts the open end of bore 76 to limit this tilting movement. Hence this other plunger 44 or 48 receives all the biasing load of spring 72 and the limiting brake pressure at the outlet port 62 or 68 of the still-functioning sub-system is substantially double the normal cut-in pressure.

Figure 7:
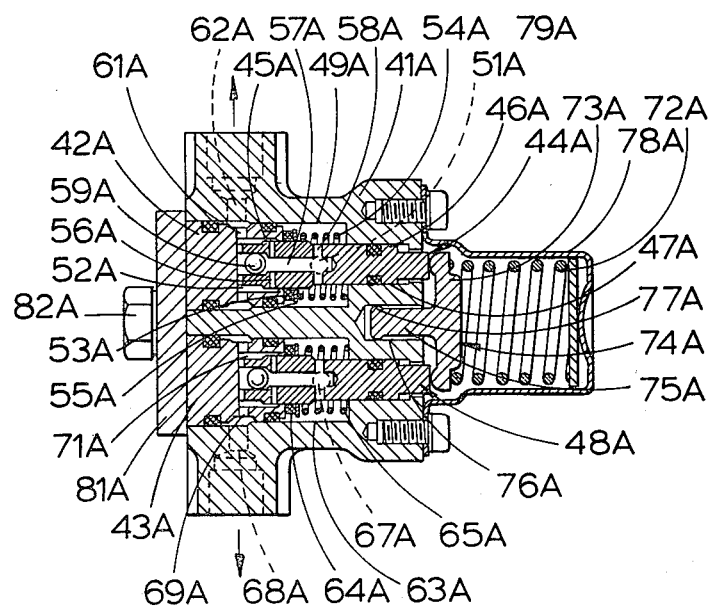
FIG. 7 is a cross-sectional view, similar to FIG. 5, of a dual pressure reducing valve unit based on the limiting valve unit shown in FIGS. 5 and 6.

In the modification to the dual valve unit shown in FIGS. 5 and 6, which is shown in FIG. 7, the same reference numerals as those used in FIGS. 5 and 6 are used with a suffix A to distinguish. The modification relates to the diameter of the second cylindrical surface portion 46A of the first plunger 44A which is reduced compared with that of the first cylindrical surface portion 45A, the second plunger 48A being altered correspondingly. The valve unit now acts as a dual pressure reducing valve unit since the pressure in each annular chamber 49A, 63A can exert a load on the respective plunger 44A 48A which biases it towards the respective outlet port 62A,68A against the load exerted by pressure in the respective end chamber 52A,71A. The plungers 44A,48A move against the force of spring 72A under the differences in the loads applied by the pressures in the end chambers 52A,71A and the annular chambers 49A,63A to cause the seals 53A,64A to block the diametral passages in the plungers 44A,48A. After the initial closure of the passages increasing pressure in the annular chambers 49A,63A causes the plungers 44A,48A to move against spring 72A to re-open the passages and then move back again as the pressure in the end chambers 52A,71A is increased, the plungers 44A 48A continuing to shuttle to and fro to maintain a difference between the master cylinder pressure and rear brake pressures which is a function of the differences in the cross-sectional areas of the plunger portions 45A,46A and the corresponding portions of plunger 63A.

With decreasing master cylinder pressure, the plungers 44A, 48A move to compress the spring 72A and reduce rear brake pressure in a similar relationship to that which occurred with increasing pressures. (The relationship is not exactly the same because the plungers 44A and 48A compress the spring 72A to a greater extent when moving under decreasing pressure than when shuttling with increasing pressure and this relationship is dependent both on the spring rate of the spring 72A and on the compressibility of the hydraulic sub-systems connected to the outlet ports 62A and 68A). When the master cylinder pressure at the inlet ports 51A and 67A has dropped to that supplied to the rear brakes through the outlet ports 62A and 68A the seals 53A and 64A lift away from the annular end faces of the end plugs 42A and 43A to allow the plungers 44A and 48A to return and uncover the valve diametral passages.

If one brake sub-system suffers a failure which results in the loss of pressure at one of the inlet or outlet ports 51A,62A,67A or 68A then the plunger 44A or 48A associated with the other sub-system receives the full biassing load of the spring 72A when subject to pressure at the associated inlet and outlet ports. Thus the magnitude of the cut-in pressure when the valve unit starts to reduce the brake pressure relative to master cylinder pressure in the other brake sub-system is substantially doubled compared with normal cut-in pressure.

Figure 8:
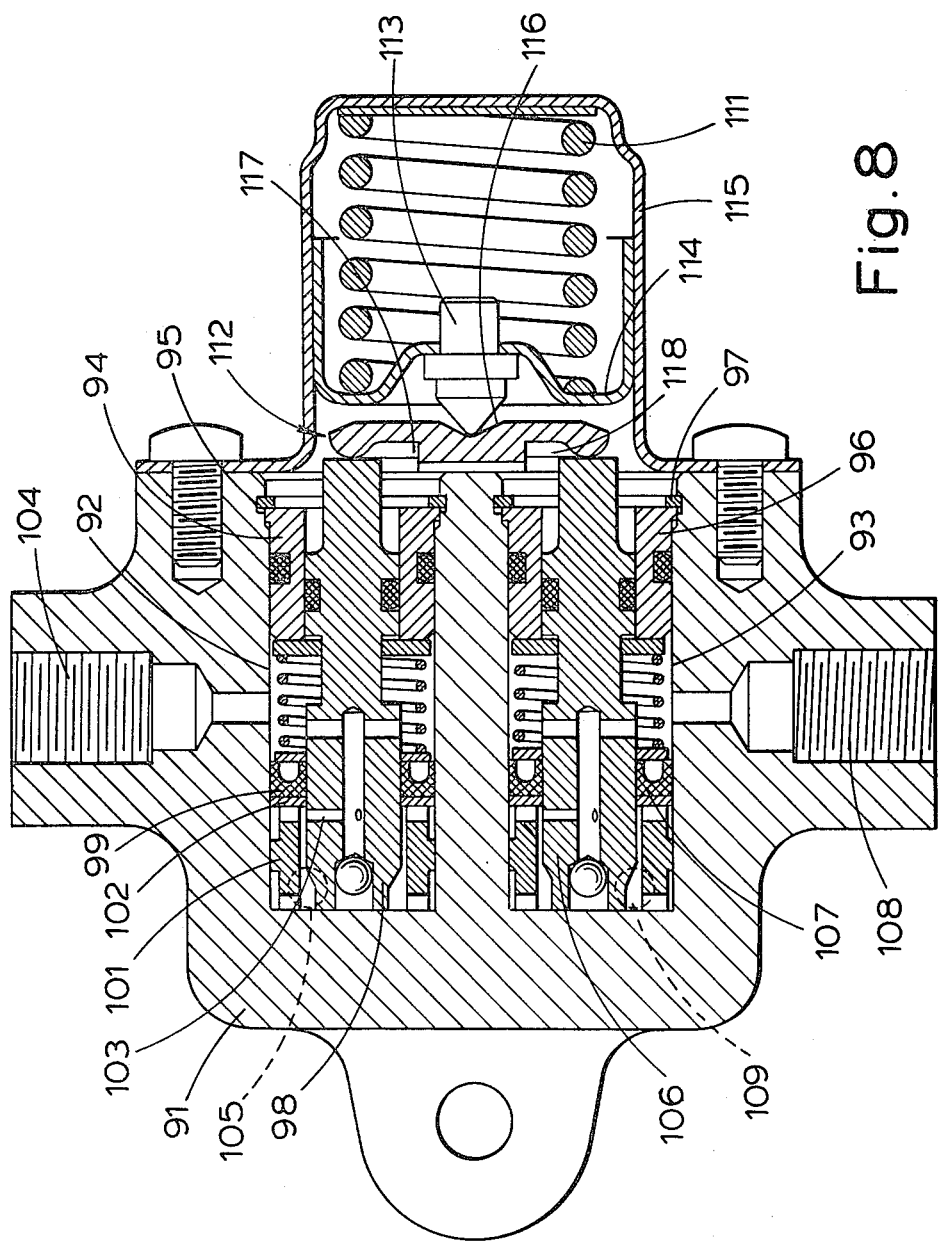
FIG. 8 is a cross-sectional view of a third embodiment of a dual pressure limiting valve according to the invention.

The valve unit shown in FIG. 8 uses a pair of limiting valves which are similar to those shown in FIGS. 5 and 6. A housing 91 has two parallel straight blind bores 92 and 93. A guide bush 94 is retained in the open end of bore 92 by a circlip 95 and an identical bush 96 retained in bore 93 by a circlip 97.

A first plunger 98, similar to plunger 44 is slidable in bush 94 and in an annular cup seal 99. This seal 99 corresponds to seal 53 but since it also seals on the bore 92 it renders unnecessary any additional static seals for a spacer collar 101 which corresponds to the annular extension of end plug 42. A metal washer 102 backs the seal 99. In this embodiment three radial passages 103 are used instead of diametral passage 56. A first inlet port 104 corresponds to port 51 and a first outlet port 105 corresponds to port 62.

A second plunger 106, identical to the first plunger 98 is slidable in bush 96 and in another annular cup seal 107. A second inlet port 108 corresponds to port 67 and a second outlet port 109 corresponds to port 68.

The plungers 98 and 106 are biassed towards the closed ends of bores 92 and 93 respectively by a spring 111 which acts through a beam 112 to divide the spring load into equal biassing loads on each plunger. The beam 112 is a sintered iron component and pivots on a ridged end of a pivot peg 113 carried on a pressed steel guide plunger 114 which is slidable in a spring retainer pressing 115. To minimise corrosion and frictional problems the plunger 114 may be moulding of a plastics material such as an acetal resin The beam has one shallow angle transverse vee groove 116 for location on the pivot peg 113 and two rectangular section longitudinal grooves 117 and 118 adjacent the ends of the beam and in the opposite side to locate the beam on the plungers 98 and 106. The bases of grooves 117 and 118 have raised humps where they abut and pivot on the adjacent end faces of the plungers 98 and 106.

Operation of this valve unit is similar to that of the unit shown in FIGS. 5 and 6. The first inlet port 104 and the first outlet port 105 are for connection to the master cylinder (or equivalent) and one rear brake actuator respectively in one sub-system of a motor vehicle split braking system and the second inlet port 108 and the second outlet port 109 are for connection to the master cylinder (or equivalent) and another rear brake actuator respectively in another sub-system of the split braking system.

With no pressure at either inlet port 104 or 108 the plungers 98 and 106 each abut the closed ends of bores 92 and 93 respectively. In this position brake fluid can flow from the first inlet port 104 to the first outlet port 105 through the passages in the first plunger 98 and likewise brake fluid can flow from the second inlet port 108 to the second outlet port 109 through the passages in the second plunger 106.

As pressures to the rear brakes increase, the fluid pressure loading on each plunger 98 and 106 reaches a level which causes each plunger to move against spring 111. The first plunger 98 thus moves through seal 99 and allows this seal 99 to block the radial passages 103 and prevent a further increase of pressure at the first outlet port 62 whilst the second plunger moves through seal 107 and allows this seal 107 to block the corresponding radial passages in the second plunger 106 and prevent a further increase of pressure at the second outlet port 109.

With decreasing pressure at the inlet ports 104 and 108 each seal 99 and 107 acts in the known manner of this type of cup seal to allow flow from each outlet port 105 and 109 to the respective inlet ports 104 and 108. Alternatively the pressure difference across each seal may move the seal towards the beam 112 and uncover passages 103. In either event the initial reduction in pressure at the outlet ports 105 and 109 allows each plunger 98 and 106 to return to its original position.

If one brake sub-system suffers a failure which results in the loss of pressure at one of the inlet or outlet ports 104, 105, 108 or 109, then the plunger 98 or 106 associated with that one sub-system remains in, or moves into, abutment with the closed end of the respective bore 92 or 93 whilst the other plunger 98 or 106 is moved away from or remains spaced from, the closed end of the respective bore 92 or 93 by pressure at the respective outlet port 105 or 109. The beam 112 is tilted about the pivot peg 113 until it contacts the end face of guide plunger 114 and allows the spring 111 to exert its full load through the end portion of the beam onto the plunger which is still functioning. Hence the limiting pressure at the outlet port 105 or 109 in still-functioning sub-system is substantially double the normal cut-in pressure.

We claim:

1. A dual pressure modulating valve unit for a vehicle braking system comprising:

a housing having a first and second bores therein, the second bore extending substantially parallel to the first bore;

a first inlet port in the housing opening into said first bore for connection to a driver controlled source;

a second inlet port in the housing opening into said second bore for connection to the driver controlled source;

a first outlet port in the housing opening into said first bore for connection to one brake actuator;

a second outlet port in the housing opening into said second bore for connection to another brake actuator;

a first plunger slidable in the first bore to control communication between the first inlet port and the first outlet port;

a second plunger slidable in the second bore to control communication between the second inlet port and the second outlet port;

a beam pivotally connected adjacent one end thereof to the first plunger and adjacent the other end thereof to the second plunger;

a pivotal connection on said beam intermediate the ends thereof;

biasing means for applying a biasing load to said plungers;

and thrust transmitting support means between said biasing means and said pivotal connection;

said beam being pivotable between a normal mode in which the load of the biasing means is divided between said plungers, and an inactive mode in which under the condition of one only of said plungers being under fluid pressure, the load of the biasing means is transmitted in a direct line through the support means to said one plunger and not through said pivotal connection.

2. The valve unit of claim 1, wherein the support means can abut said one plunger.

3. The valve unit of claim 1, wherein the support means provides lateral location for the beam.

4. The valve unit of claim 3, wherein the beam is carried in a groove in the support means.

* * * * *